United States Patent

Thuillier

[15] 3,691,274
[45] Sept. 12, 1972

[54] COMPOSITIONS CONTAINING A HEART EXTRACT

[72] Inventor: Yvonne Thuillier, 16 rue Brunel, Paris, 16°, France

[22] Filed: April 16, 1968

[21] Appl. No.: 721,879

[30] Foreign Application Priority Data

April 17, 1967 France....................67102957

[52] U.S. Cl. ....................424/95, 424/224, 424/263, 424/309
[51] Int. Cl. .............................................A61k 17/00
[58] Field of Search.................424/95, 224, 263, 309

[56] References Cited

UNITED STATES PATENTS 2,143,475 1/1939 Chase..........................424/95
2,472,130 6/1949 Emerich.......................424/95

OTHER PUBLICATIONS

Miock Index 7th Edition 1960, pages 21, 107, 506, and 878.

Primary Examiner—Albert T. Meyers
Assistant Examiner—Daren M. Stephens
Attorney—Hane and Baxley

[57] ABSTRACT

The invention provides myocardiotonic compositions comprising a non-specific heart extract and one or more of adenosine-triphosphoric acid or salt thereof, aspartic acid or a salt thereof, and vitamin $B_6$.

3 Claims, No Drawings

COMPOSITIONS CONTAINING A HEART EXTRACT

THE PRESENT INVENTION relates to pharmaceutical compositions containing a despecified heart extract, which are particularly useful as myocardiotonic compositions, and to their preparation.

In French B.S.M. No. 1952M of 18th Apr. 1962, a heart extract is described which is obtained by a particular despecification process which preserves the integral nature of the cellular content in its natural physiological equilibrium. The heart extract is obtained by the process described in this B.S.M., essentially by abrupt freezing to −78° C of the fresh organ which has been aseptically removed after slaughter from selected animals, followed by a despecification at low temperature to remove the antigenic activity, and rendering the product anallergenic, by the methods described in my copending patent application Ser. No. 863,696, filed Oct. 13, 1969, which is a continuation-in-part of my patent application Ser. No. 530,325, filed Feb. 28, 1966, and now abandoned, which was a continuation-in-part of my patent application Ser. No. 247,827, filed Dec. 28, 1962, and now abandoned. The despecification is carried out in two stages, first by treatment with activated trypsin at a pH close to 8, the trypsin being stabilized by means of calcium ions, and by a second treatment to fix the euglobulins which consists in lowering the pH to about 3.7 with sulphuric acid, neutralizing this sulphuric acid to about pH 9 by adding barium or calcium hydroxide, and then filtering the precipitate formed, which retains the euglobulins.

The present invention relates to compositions which combine the abovementioned heart extract with particular compounds which render the cardiotonic effect of the said heart extract more powerful.

The new compositions comprise the non-specific heart extract and one or more of (a) adenosine-triphosphoric acid or a salt thereof; (b) aspartic acid or a salt thereof; and (c) vitamin $B_6$, which prove interesting. Adenosine-triphosphoric acid possesses vasodilatant properties. Aspartic acid has anti-fatigue properties. Vitamin $B_6$ acts as a cardiac regulator and allows the desaturation of atherogenic fatty acids. The new compositions have an effective synergistic and cardiological activity in various types of cardiopathies, rhythmic disturbances, and for regression of cardiac ailments caused by strain.

Adenosine-triphosphoric acid (or A.T.P.) is preferably used as its disodium salt, hereafter designated by the term ATP $Na_2$, or as its dipotassium salt.

The aspartic acid is preferably used in the form of a salt of an alkali metal salt, such as the sodium or potassium salt, or of an alkaline earth metal salt, such as the magnesium salt.

To prepare the new compositions the heart extract is mixed at a low temperature, according to the usual methods, with one or more of the abovementioned complementary compounds and the composition thus obtained is then lyophilized. The lyophilization makes it possible to store the compositions stably without risk or degradation of the cellular constituents of the heart extract.

The lyophilisation is best carried out by freezing within a few seconds to a temperature of about −80° C in a vacuum of about $-10^{-4}$ mm Hg.

The lyophilized compositions may be dissolved in a suitable quantity of a physiological solvent such as physiological serum.

The following are Examples of compositions according to the invention.

Composition No. 1
| | |
|---|---|
| Heart extract | 150 mg |
| A.T.P. $Na_2$, apyrogenic | 5 mg |
| Physiological saline | 5 ml |

Composition No. 2
| | |
|---|---|
| Heart extract | 150 mg |
| A.T.P. $Na_2$, apyrogenic | 10 mg |
| Physiological saline | 5 ml |

Composition No. 3
| | |
|---|---|
| Heart extract | 150 mg |
| A.T.P. $Na_2$, apyrogenic | 5 mg |
| Vitamin $B_6$ | 20 mg |
| Physiological saline | 5 ml |

Composition No. 4
| | |
|---|---|
| Heart extract | 150 mg |
| A.T.P. $Na_2$, apyrogenic | 5 mg |
| Vitamin $B_6$ | 20 mg |
| Mg DL – aspartate } K DL – aspartate } | 50 mg |
| Physiological saline | 5 ml |

The pharmacological study of the new compositions was carried out as follows.

First, a comparative test of various heart and aorta extracts was made without addition of the complementary constituents. The purpose of these experiments was to compare the activity of different extracts made starting either with the heart or with the aorta. In effect, it was interesting to investigate whether the cardiotonic activity was more or less topographically localized in different parts of these systems. Thus the action of extracts of the whole heart, of extracts of nodal tissue, and of aorta extracts taken at various distances from the heart was examined.

The most commonly used method for this type of study was used, namely using the Ringer solution-perfused frog heart. This simple preparation has the advantage of allowing quantitative comparisons of the heart extracts, and it has also been used to study the adenosine-phosphoric acid derivatives. The experiments were carried out both on Fresh hearts, that is to say used immediately after being mounted on the cannula, and on hearts fatigued by several hours perfusion. The value of using fatigued hearts is their greater sensitivity to cardiotonic agents and in particular to A.T.P. Other experiments were carried out on isolated mammal hearts and on the whole animal.

The influence of a heart extract and of various aorta preparations on the perfused frog's heart was determined (preparation A).

The various preparations studied (fractions respectively designated A5, A6, A7), which were sampled at various levels of the aorta, were tested under the same conditions as above. These aorta preparations show themselves to be practically inactive on the frog's heart.

On the other hand the tests confirmed the activity of the preparation on a total heart extract (preparation B). However, the preparation made from nodal tissue is the most active (preparation C).

Once the above results had been established, a series of experiments was carried out to determine the behavior of preparations B and C in comparison with compositions containing the same heart extracts but associated with the complementary constituents of the present invention (as in the abovementioned compositions 1 to 4).

A composition designated preparation D and containing the abovementioned heart extract as well as ribonucleic acid (RNA) was also used in these series of comparative experiments.

The results of the tests are reported in table I.

| Preparations and Compositions studied | Nature of the constituents | Proportion of the constituents | Doses ml | Depression phase | % increase in amplitude of the heart movements | Observations on the duration of action, in minutes |
|---|---|---|---|---|---|---|
| preparation B | heart extract, 5 ml flask | 150 mg | 0.1 0.2 0.3 | | 25 50 to 100 50 to 100 | 15 to 25 15 to 25 15 to 25 |
| preparation C | nodal tissue extract, 5 ml flask | 150 mg | 0.1 | | 50 to 100 | 15 to 20 |
| preparation D | heart extract RNA 5 ml flask | 150 mg 50 mg | 0.1 0.2–0.3 | | 25 50 to 100 | 10 to 15 |
| composition No. 1 | heart extract, ATP Na₂, apyrogenic physiological saline | 150 mg 5 mg | 0.1 0.2 | | 75 to 100 | 25 to 30 |
| composition No. 2 | heart extract, ATP Na₂, apyrogenic physiological saline | 5 ml 150 mg 10 mg 5 ml | 0.1 0.2 | | 75 to 100 | 25 to 30 |
| composition No. 3 | heart extract ATP Na₂, apyrogenic vitamin B₆ physiological saline | 150 mg 5 mg 20 mg 5 ml | 0.1 0.2 | | 100 | 45 |
| composition No. 4 | heart extract ATP Na₂, apyrogenic vitamin B₆ Mg DL aspartate) K DL aspartate) physiological saline | 150 mg 5 mg 50 mg 5 ml | 0.1 0.2 | Fibrillation 5 to 10 mins | 100 | 50 |

On examining Table I, it can be observed that the heart extract with addition of RNA (preparation D) produces a weaker action and a shorter duration than if the heart extract is used alone. Conversely, the addition of apyrogenic ATP Na₂, according to the present invention produces a considerable increase in amplitude (100 percent) for about 30 minutes. On doubling the dose, that is to say with a dose of 0.2 ml, no detectable difference compared to a dose of 0.1 ml was observed. Nor does it seem that the doubling the dose of ATP Na₂ produces an improvement (compositions Nos. 1 and 2).

The addition of vitamin B₆ and Mg aspartate and K aspartate produce, in the case of the 0.1 ml dose, an increase of amplitude for a longer duration (compositions Nos. 3 and 4).

However a fibrillation action was observed caused by the aspartate salts, but this action is solely observed on isolated organs and is not reproduced in experiments carried out on whole animals, as described below.

A method for measuring the variations in amplitude of the heart movements in situ was used. The animals used were rats and monkeys, anesthetized with chloral at the rate of 0.3 g/kg and kept under artificial respiration throughout the duration of the experiment. The injections were given in the jugular vein.

It should be noted that the action of all the products tested was more marked on a fatigued heart after it had been in use at least one and a half hours. The heart is considered to be fatigued when the amplitude is 50 percent of the initial amplitude.

A particular study of composition No.4 was then carried out; this composition comprises a combination of ATP Na₂, vitamin B₆, and K and Mg aspartate salts with the heart extract, in accordance with the proportions indicated above. This study was for the purpose of comparison with the heart extract by itself. Table II below summarizes the results.

TABLE II

| Product studied | Doses ml | Phase | Increase in amplitude, % | Observations (duration of action in mins.) |
|---|---|---|---|---|
| Heart extract alone | 0.1 | ± | 50 – 100 | 20 – 25 |
| Preparation B | 0.2 | ± | 50 – 100 | 20 – 25 |
| Composition No. 4 | 0.1 | + | 100 | 45 |
| Composition No. 4 according to present invention | 0.2 | + | 150 | 45 |

With a dose of 0.1 ml an abrupt increase in amplitude of about 100 percent (1 second) was observed, followed by a brief depression and again an increase in amplitude of 100 percent for 45 minutes. With a dose of 0.2 ml the same action was with 0.1 ml is noted but in this case the depression is slightly greater and there is an increase in amplitude of the order of 150 percent for the same time as previously. In conclusion, of all the products tested composition No.4 appeared to produce the greatest action for the longest time.

A comparative study of the pure heart extract and of composition No. 4 on arteriosclerotic rats was furthermore carried out. For this purpose an intramuscular injection of 50 mg/kg. of the product studied was given. The results show that composition No.4 increases the concentration of potassium in the blood, an improved proportion of myocardial potassium, and a sodium/potassium ratio which is clearly improved in comparison to the results obtained with the pure heart extract.

The new compositions may be formulated in appropriate pharmaceutical forms for oral or parenteral administration or administration by arterial perfusion, and in combination with one or more pharmaceutically suitable excipients for treating cardiopathies of various types, in particular rythmic disturbances and cardiac disturbances caused by abnormal exertion.

Tests of stability against time were carried out with the abovementioned compositions as solutions kept in a refrigerator. The results show that the activity of the compositions is preserved for periods of between 3 and 4 months.

In order to define the units of activity of heart extract, composition No.3, corresponding to 175 mg of lyophilised mixture, was calibrated. Tests carried out at various dilutions produced with Ringer solution allowed a unit to be defined as the smallest dose of the mixture which produces a 50 percent increase in the amplitude of the cardiac contractions of an isolated frog's heart which has been fatigued by use for at least 2 hours. 1 unit of heart extract = $175 \cdot 10^{-4}$ mg. 1 flask thus contains 10,000 units of heart extract. This increase in amplitude is not achieved with doses of less than $175 \cdot 10^{-4}$ mg of mixture while with doses greater than 1 unit of heart extract the increase is 100 percent and appears to have reached a maximum.

I claim:

1. A pharmaceutical composition in dosage form, comprising 150 parts by weight of despecified heart extract and from 5 to 10 parts of the disodium or the dipotassium salt of adenosine triphosphate.

2. A pharmaceutical composition in dosage form, comprising 150 parts by weight of despecified heart extract and 50 parts by weight of at least one of the sodium, potassium or magnesium salts of aspartic acid.

3. A pharmaceutical composition in dosage form comprising 150 parts by weight of a despecified heart extract, and at least one of:
  a. 5 to 10 parts by weight of a compound selected from the group consisting of adenosine triphosphate and its non-toxic metal salts,
  b. 50 parts by weight of a compound selected from the group consisting of aspartic acid and its non-toxic metal salts, and
  c. 20 parts by weight of vitamin B6, admixed with an acceptable pharmaceutical carrier.

* * * * *